United States Patent
Tomlinson et al.

(10) Patent No.: US 11,261,338 B2
(45) Date of Patent: Mar. 1, 2022

(54) METHODS OF REDUCING THE ADHESION OF A MASKANT

(71) Applicant: AC PRODUCTS, INC., Whittier, CA (US)

(72) Inventors: David Tomlinson, La Mirada, CA (US); Bryan Vu, Temple City, CA (US); James Wichmann, Anaheim, CA (US); Peter Weissman, Long Beach, CA (US); Gregory Dancy, Azusa, CA (US); Thomas Farrell, West Covina, CA (US)

(73) Assignee: AC PRODUCTS, INC., Whittier, CA (US)

( * ) Notice: Subject to any disclaimer, the term of this patent is extended or adjusted under 35 U.S.C. 154(b) by 0 days.

(21) Appl. No.: 16/671,758

(22) Filed: Nov. 1, 2019

(65) Prior Publication Data

US 2020/0140704 A1    May 7, 2020

Related U.S. Application Data

(60) Provisional application No. 62/755,112, filed on Nov. 2, 2018.

(51) Int. Cl.
| | | |
|---|---|---|
| *C09D 9/00* | (2006.01) | |
| *C09D 175/04* | (2006.01) | |
| *C09D 175/02* | (2006.01) | |
| *C23C 18/26* | (2006.01) | |
| *C23F 1/14* | (2006.01) | |

(52) U.S. Cl.
CPC ............ *C09D 9/005* (2013.01); *C09D 175/02* (2013.01); *C09D 175/04* (2013.01); *C23C 18/26* (2013.01); *C23F 1/14* (2013.01)

(58) Field of Classification Search
CPC .... C09D 9/005; C09D 175/04; C09D 175/02; C09D 5/008; C23F 1/14; C23C 18/26

USPC ............................................ 216/95, 96, 102
See application file for complete search history.

(56) References Cited

U.S. PATENT DOCUMENTS

| | | | |
|---|---|---|---|
| 3,544,400 A | 12/1970 | Deutsch | |
| 5,011,621 A * | 4/1991 | Sullivan | ................. C09D 9/005 |
| | | | 252/364 |
| 5,411,678 A | 2/1995 | Sim | |
| 5,425,893 A * | 6/1995 | Stevens | .................... C09D 9/04 |
| | | | 134/1 |
| 5,518,661 A * | 5/1996 | Langford | ............. C11D 7/5018 |
| | | | 252/364 |
| 6,673,157 B1 | 1/2004 | McKim | |
| 7,531,074 B2 * | 5/2009 | Purdy | ...................... B05D 7/16 |
| | | | 204/488 |
| 7,767,637 B2 | 8/2010 | Simandl | |
| 9,353,285 B2 * | 5/2016 | Huybrechts | .......... C09D 175/04 |
| 2014/0124128 A1 | 5/2014 | Moritz | |

FOREIGN PATENT DOCUMENTS

RU    2507230 C1    2/2014

OTHER PUBLICATIONS

International Search Report dated Jan. 15, 2020 in International Appl. No. PCT/US2019/059414, 3 pages.
International Preliminary Report on Patentability dated Jan. 15, 2020 in International Appl. No. PCT/US2019/059414, 8 pages.

* cited by examiner

*Primary Examiner* — Duy Vu N Deo
(74) *Attorney, Agent, or Firm* — Morgan, Lewis & Bockius LLP

(57) ABSTRACT

A method for reducing adhesion between a maskant and a substrate, wherein the maskant is adhered to a surface of the substrate, the method comprising applying a composition to the maskant.

17 Claims, No Drawings

METHODS OF REDUCING THE ADHESION OF A MASKANT

CROSS-REFERENCE TO RELATED APPLICATION

This application claims priority benefit from U.S. Provisional Patent Application No. 62/755,112, "Methods of Reducing the Adhesion of a Maskant" filed Nov. 2, 2018, which is incorporated by reference herein in its entirety.

BACKGROUND OF THE INVENTION

The present invention generally relates to masking technology, and more particularly, to a method for reducing the adhesion between a maskant and a substrate.

There exist in industry hand removable coatings (also referred to herein as maskants) for the use of protecting the surface of metals, ceramics, plastics, etc., from abrasion, corrosion, and for the purposes of selectively etching, plating, or treating the surface of the substrate upon which the coating has been applied. Coatings made from older technology are made from a rubber or elastomer dissolved in a solvent carrier, and applied to the substrate via such typical application methods as immersion, spraying, flow coating, roller coating, etc. The solvent is then evaporated and the remaining coating has a defined level of adhesion on the substrate. While such coatings work well on many different substrates, they normally contain large amounts of often toxic solvents (typically around 80% by volume), which makes them difficult to use in an uncontrolled environment.

More recently, people have designed plural component reactive coatings systems that provide the same function as these solvent based systems but do not contain the toxic solvents. These components are sprayed onto various substrates by being mixed (leading to a chemical reaction) at the spray tip during application. One application of this type of coating is for the use of "Chemical Milling" various metals such as aluminum, titanium and steel. These plural component coatings have been sold industrially for this use for nearly 20 years. One of the weaknesses of this technology, however, is that the adhesion of the coating can vary substantially during the process. If the adhesion drops too low during exposure to the etchant used to remove the metal, then poor "line definition" will result, and the part may be considered out of spec and may be non-salvageable. On the other hand, if the adhesion of the coating is too high, then after the metal removal process has been completed the coating can be extremely difficult to remove and result in excessive labor or time to remove the maskant from the substrate. More recently there has been a trend to use these coatings for the manufacture of much larger parts (e.g., 11 m long×3-4 m high). However, as compared to similar solvent based coatings, the plural component coatings have drastically increased the length of time for removal e.g., from what was 5 minutes with the solvent based coatings to now 30-40 minutes with the plural component coatings.

There have been many efforts to try to reduce the adhesion of the protective coating and assist in the removing process. Immersion of plural component masked parts in water may temporarily reduce adhesion (also referred to as "peel strength"), while maintaining the desirable mechanical properties of the maskant film defined by strength and elongation. However, this water immersion method results in insufficient duration of reduced adhesion for practical maskant removal, typically less than 30 minutes. Use of mechanical aids have been tried to speed the removal of the coating as the time required. All of these ideas have failed to provide acceptable results.

BRIEF SUMMARY OF THE INVENTION

In an embodiment, a method of reducing adhesion between a maskant and a substrate from an initial adhesion, wherein the maskant is adhered to a surface of the substrate, includes applying a composition to the maskant to achieve a subsequent adhesion that is less than the initial adhesion. In some embodiments, a method of reducing adhesion between a maskant and a substrate from an initial adhesion, wherein the maskant is adhered to a surface of the substrate, includes applying a composition to the maskant to achieve a subsequent adhesion that is less than the initial adhesion while maintaining mechanical properties of the maskant film, for a period of time sufficient to remove the maskant. In some embodiments such period of time may be at least 1 day, at least 4 days, or at least 1 week.

In some embodiments the composition comprises a solvent. The solvent may comprise or consist essentially of one or more of benzyl alcohol, triethanolamine, and ester alcohol, such as an aqueous solution of benzyl alcohol, triethanolamine, and/or ester alcohol or an aqueous dispersion of benzyl alcohol, triethanolamine, and/or ester alcohol. In some embodiments the composition consists essentially of one or more of benzyl alcohol, triethanolamine, and ester alcohol, an aqueous solution of benzyl alcohol, triethanolamine, and/or ester alcohol, or an aqueous dispersion of benzyl alcohol, triethanolamine, and/or ester alcohol. The solvent may comprise or consist essentially of benzyl alcohol, an aqueous solution of benzyl alcohol or an aqueous dispersion of benzyl alcohol. The solvent may comprise or consist essentially of triethanolamine, an aqueous solution of triethanolamine or an aqueous dispersion of triethanolamine. The solvent may comprise or consist essentially of ester alcohol, an aqueous solution of ester alcohol, or an aqueous dispersion of ester alcohol. In some embodiments the composition includes one or more of a flame retardant, an amine, a plasticizer, and a surfactant. A flame retardant may include a halogen, and/or the flame retardant may include phosphorous. A surfactant may be an ionic surfactant or a non-ionic surfactant.

In some embodiments the maskant is a product of a two component reaction system, such as a 2K maskant. In some embodiments the maskant comprises a polyurea. In some embodiments the maskant comprises a polyurethane.

In some embodiments the substrate includes a metal. The metal may include aluminum, for example clad aluminum or bare aluminum. The metal may be heat-treated, for example heat-treated clad aluminum or heat-treated bare aluminum. In some embodiments the metal may include a metal alloy, for example steel or austenite nickel-chromium-based superalloys (Iconel). In some embodiments the metal may include titanium.

In some embodiments the composition is applied by painting, immersion, flow coating, or spraying.

In some embodiments of the method, the subsequent adhesion is between 60% and 0.1% of the initial adhesion. In some embodiments of the method, the subsequent adhesion is less than 60% of the initial adhesion. In some embodiments of the method the subsequent adhesion is between 4 oz/in and 0.1 oz/in. In some embodiments the subsequent adhesion is reduced to between 60% and 0.1% of the initial adhesion within one hour of application. In some embodiments the subsequent adhesion remains reduced to between 60% and 0.1% of the initial adhesion for at least 1 day, at least 4 days, or at least 1 week. In some embodiments the subsequent adhesion remains reduced to less than 60% of the initial adhesion for at least 1 day, at least 4 days, or at least 1 week. In some embodiments the subsequent adhesion is less than the initial adhesion for a period of time, the method further comprising applying the composition to the maskant one or more additional times to prolong the period of time during which the subsequent adhesion is less than the initial adhesion.

In some embodiments of the method, maskant has an initial tensile strength before application of the composition and a subsequent tensile strength after application of the composition, wherein the subsequent tensile strength is at least 15% of the initial tensile strength.

DETAILED DESCRIPTION OF THE INVENTION

Ideally, a treatment, once applied, will have a latent effect of the maskant coating resulting in lower adhesion, but not detachment of the maskant film from the substrate, for a defined period of time, typically more than 24 hours. Further the treatment must not only reduce the adhesion of the coating a defined amount and not completely eliminate adhesion since the part which has the coating still on it requires further processing (such as routing, drilling of holes, and cutting or trimming) prior to removal of the coating. Finally, the treatment must not substantially impact the coating's mechanical properties or chemical resistance properties as doing so will also impact the ability of the part with the coating to withstand abrasion and retain enough strength and elongation to be relatively easily removed.

It has been found that application of a purpose formulated composition to a maskant adhered to a substrate can reduce the adhesion of the maskant without destroying the integrity of the maskant. Such a composition may contain any chemical species which either by itself or when mixed with a suitable transport vehicle (such as water or other solvent) will penetrate the maskant film, and cause the maskant film to swell or will hydrogen bond with the maskant film thereby reducing the adhesion of the film with the substrate. Chemical species suitable for such a composition may include, but are not limited to, surfactants (ionic and non-ionic), flame retardants, amines (primary secondary or tertiary), plasticizers, solvents, and organic and inorganic salts. The maskant softener composition according to the invention may also include conventional paint stripper additives; such additives may include one or more of: a corrosion inhibitor (e.g., various triazoles, barium dinonylsulfonate salt, calcium dinonylsulfonate salt, or zinc dinonylsulfonate salt), a co-solvent (e.g., dibasic ester, aromatic 100, anisole, dioxolane, nipar S-10 (niroparaffin), dimethyl sulfonate), an activator, a thickener (e.g., various cellulosics, silica, bentonite, hectorite), a stabilizer, and an evaporation inhibitor. In particular, addition of fats of animal or vegetable origin, for example certain esterified fats, may be useful to reduce the flammability of the composition (e.g., polyethylene, paraffin, non-ionic paraffin wax). Cellulosic derivatives such as methyl cellulose or AEROSIL® fumed silicas (such as pyrogenous silica) can be added to thicken the composition.

Methods of the invention utilize a composition that reduces the adhesion of the maskant to the substrate for a period of time, allowing the maskant to be easily removed hours or even days after application of the composition without additional chemical processing. For example, the material comprising the maskant and substrate may undergo chemical milling in one facility, which facility may also have the equipment and safety protocols necessary or desirable for application of a composition in accordance with embodiments of the invention; the material may then undergo further processing in a separate facility that does not have the equipment and safety protocols necessary or desirable for application of a chemical composition to remove the maskant. A notable distinction between methods of the present invention and application of traditional paint strippers is that methods in accordance with the present invention allow for the adhesion to be reduced without losing the physical integrity of the maskant, allowing the material to be subsequently worked (machined), and optionally in a location remote to where the composition was applied.

In some embodiments methods of the invention are useful with a substrate that has been coated, or partially coated, with a maskant. Suitable maskants include plural component reactive coatings system maskants, i.e., coating systems wherein a plurality of starting components are mixed during application to a substrate (e.g., in a spray tip), leading to a chemical reaction between the components to form the maskant. Such maskants are commonly referred to as 2K maskants. For example, such a maskant may comprise a polyurethane, polyurea, polyisocyanate, polyamide, polyol, polybasic acid, acid chloride, or acid anhydride polymers. Suitable maskants include those taught in U.S. Pat. No. 3,544,400, which is hereby incorporated by reference in its entirety.

Suitable substrates include, but are not limited to metals, metal alloys, ceramics, and plastics. In some embodiments the substrate is a metal, for example aluminum, titanium, or steel. In some embodiments the substrate is an aluminum, magnesium, ferrous, beryllium or other metal alloy, for example an austenite nickel-chromium-based superalloy (sometimes sold under the name ICONEL®). In some embodiments the metal is clad, e.g., clad aluminum, while in other embodiments the metal is bare, e.g., bare aluminum. In some embodiments the metal is heat-treated, e.g., heat-treated bare aluminum or heat-treated clad aluminum.

In some embodiments a method of reducing adhesion between a maskant and a substrate comprises applying a composition to the maskant. The composition may be an organic solvent, for example a polar organic solvent.

In some embodiments the composition may comprise or consist essentially of benzyl alcohol. In some embodiments the composition may comprise or consist essentially of an aqueous solution or dispersion of benzyl alcohol. In some embodiments the composition comprises an aqueous solution of 1 wt % to 5 wt % benzyl alcohol, or an aqueous dispersion of 1 wt % to 50 wt % benzyl alcohol, 5 wt % to 50 wt % benzyl alcohol, 10 w % to 50 wt % benzyl alcohol, 25 wt % to 50 wt % benzyl alcohol, 35 wt % to 50 wt % benzyl alcohol, 5 wt % to 25 wt % benzyl alcohol, 10 wt % to 25 wt % benzyl alcohol, 1 wt % to 15 wt % benzyl alcohol, 5 wt % to 15 wt % benzyl alcohol, 5 wt % to 10 wt % benzyl alcohol, 1 wt % to 5 wt % benzyl alcohol, 2 wt % to 5 wt % benzyl alcohol, or 1 wt % to 10 wt % benzyl alcohol. In some embodiments the composition comprises an aqueous dispersion of about 1 wt %, about 2 wt %, about 3 wt %, about 4 wt %, about 5 wt %, about 10 wt %, about 15 wt %, about 20 wt %, about 25 wt %, about 30 wt %, about 35 wt %, about 40 wt %, about 45 wt %, or about 50 wt % benzyl alcohol.

In some embodiments the composition may comprise or consist essentially of triethanolamine. In some embodiments the composition may comprise or consist essentially of an aqueous solution of triethanolamine. In some embodiments the composition comprises an aqueous dispersion of 1 wt % to 50 wt % triethanolamine, 5 wt % to 50 wt % triethanolamine, 10 wt % to 50 wt % triethanolamine, 25 wt % to 50 wt % triethanolamine, 35 wt % to 50 wt % triethanolamine, 5 wt % to 25 wt % triethanolamine, 10 wt % to 25 wt % triethanolamine, 1 wt % to 15 wt % triethanolamine, 5 wt % to 15 wt % triethanolamine, 5 wt % to 10 wt % triethanolamine, 1 wt % to 5 wt % triethanolamine, 2 wt % to 5 wt % triethanolamine or 1 wt % to 10 wt % triethanolamine. In some embodiments the composition comprises an aqueous solution of about 1 wt %, about 2 wt %, about 3 wt %, about 4 wt %, about 5 wt %, about 10 wt %, about 15 wt %, about 20 wt %, about 25 wt %, about 30 wt %, about 35 wt %, about 40 wt %, about 45 wt %, or about 50 wt % triethanolamine.

In some embodiments the composition may comprise or consist essentially of ester alcohol. In some embodiments the composition may comprise or consist essentially of an aqueous solution of ester alcohol. In some embodiments the composition comprises an aqueous dispersion of 1 wt % to 50 wt % ester alcohol, 5 wt % to 50 wt % ester alcohol, 10 wt % to 50 wt % ester alcohol, 25 wt % to 50 wt % ester alcohol, 35 wt % to 50 wt % ester alcohol, 5 wt % to 25 wt % ester alcohol, 10 wt % to 25 wt % ester alcohol, 1 wt % to 15 wt % ester alcohol, 5 wt % to 15 wt % ester alcohol, 5 wt % to 10 wt % ester alcohol, 1 wt % to 5 wt % ester alcohol, 2 wt % to 5 wt % ester alcohol or 1 wt % to 10 wt % ester alcohol. In some embodiments the composition comprises an aqueous solution of about 1 wt %, about 2 wt %, about 3 wt %, about 4 wt %, about 5 wt %, about 10 wt %, about 15 wt %, about 20 wt %, about 25 wt %, about 30 wt %, about 35 wt %, about 40 wt %, about 45 wt %, or about 50 wt % ester alcohol.

In some embodiments the composition is selected from one or more of an aqueous solution or dispersion of benzyl alcohol, an aqueous solution or dispersion of triethanolamine, or an aqueous solution or dispersion of ester alcohol. In some embodiments the composition may comprise a surfactant. In some embodiments the composition is exclusive of one or more of toluene, xylene, methylethyl ketone, acetone, and methylene chloride.

In some embodiments the composition is applied to the maskant by painting (e.g., brushing, roller coating), immersion, flow coating or spraying. The amount of composition applied to the maskant can impact the adhesion of the maskant to the substrate. The amount of composition required to achieve the desired reduction in adhesion may depend on the thickness of maskant, the composition of the maskant, and the make-up of the composition. In some embodiments of the invention the composition is applied at a thickness of about 0.001 inch, about 0.002 inch, about 0.003 inch, about 0.004 inch, about 0.005 inch, about 0.006 inch, about 0.007 inch, about 0.008 inch, about 0.009 inch, about 0.01 inch, about 0.015 inch, about 0.02 inch, or about 0.025 inch. In some embodiment the composition is applied to a thickness of about 0.001 inch to about 0.025 inch, or about 0.005 to about 0.01 inch. In some embodiments where the composition is applied by immersing the maskant-coated substrate in the composition, the amount of composition applied to the maskant can assessed by measuring the amount of time the maskant-coated substrate is submerged in the composition. In some embodiments the maskant coated substrate is submerged in the composition for about 1 second to about 60 minutes, about 1 second to about 30 minutes, about 1 second to about 20 minutes, about 1 second to about 10 minutes, about 10 minutes to about 20 minutes, about 20 minutes to about 30 minutes, about 30 minutes to about 40 minutes, about 40 minutes to about 50 minutes, about 50 minutes to about 60 minutes, about 30 minutes to about 60 minutes, about 40 minutes to about 60 minutes, about 50 minutes to about 60 minutes, or about 15 minutes to about 45 minutes.

The reduction in adhesion can be measured in a variety of ways. As used herein, the reduction in adhesion is a reduction in the adhesion forces between the maskant and the substrate from an initial strength (i.e., at a time prior to performance of the methods described herein) to a subsequent strength (i.e., at a time after application of a composition in accordance with the methods described herein). In some embodiments the reduction in adhesion is described in terms of the percentage reduction in adhesion strength from the initial adhesion strength to the subsequent adhesion strength. In some embodiments the adhesion is reduced from the initial adhesion to about 60% of the initial adhesion, from the initial adhesion to about 55% of the initial adhesion, from the initial adhesion to about 50% of the initial adhesion, from the initial adhesion to about 45% of the initial adhesion, from the initial adhesion to about 40% of the initial adhesion, from the initial adhesion to about 35% of the initial adhesion, from the initial adhesion to about 30% of the initial adhesion, from the initial adhesion to about 25% of the initial adhesion, from the initial adhesion to about 20% of the initial adhesion, from the initial adhesion to about 15% of the initial adhesion, from the initial adhesion to about 10% of the initial adhesion, from the initial adhesion to about 5% of the initial adhesion, from the initial adhesion to about 1% of the initial adhesion, or from the initial adhesion to about 0.1% of the initial adhesion. In some embodiments the adhesion can be reduced to any final adhesion that is greater than 0%; that is, wherein the maskant is not completely removed from the substrate, but maintains some minimum adherence. In some embodiments the adhesion is reduced from the initial adhesion to less than 60%, but greater than 0%, of the initial adhesion, from the initial adhesion to less than 55%, but greater than 0%, of the initial adhesion, from the initial adhesion to less than 50%, but greater than 0%, of the initial adhesion, from the initial adhesion to less than 45%, but greater than 0%, of the initial adhesion, from the initial adhesion to less than 40%, but greater than 0%, of the initial adhesion, from the initial adhesion to less than 35%, but greater than 0% of the initial adhesion, from the initial adhesion to less than 30%, but greater than 0%, of the initial adhesion, from the initial adhesion to less than 25%, but greater than 0%, of the initial adhesion, from the initial adhesion to less than 20%, but greater than 0%, of the initial adhesion, from the initial adhesion to less than 15%, but greater than 0%, of the initial adhesion, from the initial adhesion to less than 10%, but greater than 0%, of the initial adhesion, or from the initial adhesion to less than 5%, but greater than 0%, of the initial adhesion. In some embodiments the adhesion is reduced from the initial adhesion to between about 60% to about 10% of the initial adhesion, from the initial adhesion to between about 55% to about 15% of the initial adhesion, or from the initial adhesion to between about 50% to about 20% of the initial adhesion.

In some embodiments the reduction in adhesion is described in terms of the measurement of the adhesion force (e.g., in oz/in). Following the guidelines of ASTM D429B Rubber to Metal Adhesion Test Equipment, the method of measuring adhesion force utilizes an oz/in spring scale with clamp grip. A one-inch wide strip of maskant film, e.g., AC-2K maskant film, attached to the spring scale, is pulled at a 135° angle away from the metal substrate and the force (oz/in) to peel away the maskant film, e.g., AC-2K Maskant film, off the substrate is recorded as the adhesion force, or simply the adhesion value. In some embodiments, the adhesion is reduced from an initial adhesion to a subsequent adhesion of about 40 oz/in, about 30 oz/in, about 20 oz/in, about 10 oz/in, about 5 oz/in, about 2 oz/in, or about 1 oz/in. In some embodiments the adhesion is reduced from an initial adhesion to a subsequent adhesion of between about 40 oz/in and about 0.1 oz/in, between about 30 oz/in and about 0.1 oz/in, between about 20 oz/in and about 0.1 oz/in, between about 10 oz/in and about 0.1 oz/in, between about 5 oz/in and about 0.1 oz/in, or between about 1 oz/in and about 0.1 oz/in. In some embodiments the adhesion is reduced from an initial adhesion to a subsequent adhesion within a range of about 1 oz/in to about 6 oz/in, about 2 oz/in to about 6 oz/in, about 2 oz/in to about 4 oz/in, about 1 oz/in to about 40 oz/in, about 1 oz/in to about 30 oz/in, about 1 oz/in to about 20 oz/in, about 1 oz/in to about 10 oz/in, about 2 oz/in to about 6 oz/in, or about 1 oz/in to about 5 oz/in. In some embodiments, the adhesion is reduced from an initial adhesion to a subsequent adhesion of about 446 g/cm, about 335 g/cm, about 223 g/cm, about 112 g/cm, about 56 g/cm, about 22 g/cm, or about 11 g/cm. In some embodiments the adhesion is reduced from an initial adhesion to a subsequent adhesion of between about 446 g/cm and about 1 g/cm, between about 56 g/cm and about 1 g/cm, between about 45 g/cm and about 1 g/cm, between about 33 g/cm and about 1 g/cm, between about 22 g/cm and about 1 g/cm, or between about 11 g/cm and about 1 g/cm. In some embodiments the adhesion is reduced from an initial adhesion to a subsequent adhesion within a range of about 11 g/cm to about 446 g/cm, about 11 g/cm to about 335 g/cm, about 11 g/cm to about 223 g/cm, about 11 g/cm to about 67 g/cm, about 22 g/cm to about 67 g/cm or about 22 g/cm to about 45 g/cm.

In some embodiments, the adhesion is reduced from an initial adhesion to a subsequent adhesion of between about 6 oz/in to about 2 oz/in within one hour of application of the composition, within 2 hours of application of the composition, within 4 hours of application of the composition, within 8 hours of application of the composition, within 12 hours of application of the composition, or within 24 hours of application of the composition. In some embodiments the adhesion is reduced from an initial adhesion to a subsequent adhesion of between about 15% to about 50% of the initial adhesion within one hour of application of the composition, within 2 hours of application of the composition, within 4 hours of application of the composition, within 8 hours of application of the composition, within 12 hours of application of the composition, or within 24 hours of application of the composition. In some embodiments the adhesion is reduced from an initial adhesion to a subsequent adhesion of between about 15% to about 30% of the initial adhesion within one hour of application of the composition, within 2 hours of application of the composition, within 4 hours of application of the composition, within 8 hours of application of the composition, within 12 hours of application of the composition, or within 24 hours of application of the composition. In some embodiments the adhesion is reduced from an initial adhesion to a subsequent adhesion of between about 30% to about 50% of the initial adhesion within one hour of application of the composition, within 2 hours of application of the composition, within 4 hours of application of the composition, within 8 hours of application of the composition, within 12 hours of application of the composition, or within 24 hours of application of the composition.

An aspect of the invention is that the adhesion of the maskant to the substrate remains reduced for a period of time. In some embodiments, this period of time is sufficient for further processing of the substrate. In some embodiments, the adhesion remains reduced to between about 40 oz/in to about 2 oz/in for 12 hours or more after application of the composition, 24 hours or more after application of the composition, 36 hours or more after application of the composition, 2 days or more after application of the composition, 4 days or more after application of the composition, 7 days or more after application of the composition, or 2 weeks or more after application of the composition. In some embodiments, the adhesion remains reduced to between about 40 oz/in to about 2 oz/in for about 24 hours to about 2 weeks after application of the composition. In some embodiments, the adhesion remains reduced from an initial adhesion to a subsequent adhesion of between about 15% to about 50% of the initial adhesion for 12 hours or more after application of the composition, 24 hours or more after application of the composition, 36 hours or more after application of the composition, 2 days or more after application of the composition, 4 days or more after application of the composition, 7 days or more after application of the composition, or 2 weeks or more after application of the composition. In some embodiments, the adhesion remains reduced to between about 15% to about 50% of the initial adhesion for about 24 hours to about 2 weeks after application of the composition.

While not required in all embodiments, in some embodiments the physical integrity of the maskant is substantially maintained, although the adhesion is reduced. In some embodiments the physical integrity of the maskant is measured by assessing the tensile strength of the maskant film. In some embodiments the maskant has an initial tensile strength, i.e. before application of a composition in accordance with the methods described herein, and a subsequent tensile strength, i.e., after application of a composition in accordance with the methods described herein. In some embodiments the initial tensile strength and the subsequent tensile strength are substantially the same. Substantially the same can refer to a change in tensile strength of less than ±1%, less than ±5%, less than ±10%, less than ±20%, less than ±40%, less than ±60%, or less than ±80% from the initial tensile strength to the subsequent tensile strength. In some embodiments the maskant has a subsequent tensile strength that is at least 15% of the initial tensile strength, at least 17% of the initial tensile strength, at least 20% of the initial tensile strength, at least 25% of the initial tensile strength, at least 30% of the initial tensile strength, or at least 33% of the initial tensile strength. Following the guidelines of ASTM D 1708-13 "Standard Test Method for Tensile Properties Plastics by Use of Microtensile Specimens," ultimate tensile strength (also referred to herein as tensile strength) is measured using an oz/in spring scale with clamp grip. Maskant Softener formulations are applied at 10 wet mils to a 0.25 $in^2$ area on a ½ inch by 6 inch of maskant (e.g., AC-2K Maskant) with the maskant having a thickness between 0.012-0.018 inch. Ultimate tensile strength is measured by attaching the spring scale to one end of the maskant (e.g., AC-2K Maskant) film and pulling away at a 180° angle at 1 inch per second until the maskant film breaks. The maximum oz/in² value observed on the spring scale is recorded as the ultimate tensile strength (oz/in²).

In some embodiments the physical integrity of the maskant is assessed by evaluating the resistance of the maskant to sagging (i.e., sag resistance). Sag Resistance can be measured according to the guidelines of ASTM F1080-93 (2019), "Standard Test Method for Determining the Consistency of Viscous Liquids Using a Consistometer": 100 cm³ volume of material is loaded into the consistometer and allowed to flow for 5 minutes. After 5 minutes the distance traveled in centimeters is recorded. Sag resistance is measured in centimeters of flow; the targeted value for Maskant Softener to reflect good sag resistance is a consistometer flow of 10-14 cm.

EXAMPLES

Example 1

Benzyl Alcohol (100 wt % concentration) was wet out over a chemically processed AC-2K Maskant (ACP-3M) in an attempt to reduce adhesion. Initial adhesion was measured for baseline before application of benzyl alcohol. 100 wt % Benzyl Alcohol was wet out over AC-2K Maskant (ACP-3M) and dwelt on the surface in the flat for each of two panels. Subsequent adhesions were measured each day to record any 2K-maskant adhesion reduction. Adhesion measurements (oz/in) are set forth in Table 1.

TABLE 1

| AC-2K Maskant (ACP-3M) Panel #1 | | | | |
|---|---|---|---|---|
| Initial | 1 Day | 2 Day | 3 Day | 4 Day |
| 20 | 3 | 2 | 20 | 20 |
| Panel #2 | | | | |
| Initial | 1 Day | 2 Day | 3 Day | 5 Day | 10 Day |
| 56 | 48 | 24 | 18 | 20 | 36 |

A significant reduction in adhesion was observed where 100 wt % benzyl alcohol was applied in the flat to avoid running off the part. AC-2K Maskant panels were 'dry' and film swelled within 1 hour. AC-2K Maskant (ACP-3M) retained good tensile and elongation properties.

Initial results show significant reduction in adhesion while maintaining tensile and elongation strength.

Example 2

AC-2K Maskant (ACP-3A Tan) panels that have been put through the chemical milling process were immersed in modified water baths to reduce adhesion. Raw materials tested were: (1) 5 wt % Benzyl Alcohol in water; (2) 5 wt % DPM (Dipropylene glycol methyl ether) in water; and (3) 5 wt % TEA (Triethanolamine 85 wt %) in water. Initial adhesion was measured for baseline before immersion into water baths. Subsequent adhesions were measured each day to record any 2K-maskant adhesion reduction. Adhesion measurements (oz/in) are set forth in Table 2.

TABLE 2

| AC-2K Maskant (ACP-3A Tan) | | | | |
|---|---|---|---|---|
| Initial | 15 hours | 1 Day | 2 Day | 5 Day |
| 5 wt % Benzyl Alcohol in water - 30 minute immersion | | | | |
| 22 oz/in | <1 oz/in | 2 oz/in | 4 oz/in | 10 oz/in |
| Within 1 hour - 2K Maskant film was very mealy and unable to pull an adhesion | | | | |
| Film regained tensile/elongation next day | | | | |
| 5 wt % Benzyl Alcohol in water - 10 minute immersion | | | | |
| 20 oz/in | 8 oz/in | 10 oz/in | 14 oz/in | 18 oz/in |
| Adhesion reduced slightly | | | | |
| 5 wt % DPM in water - 10 minute immersion | | | | |
| 32 oz/in | 22 oz/in | 24 oz/in | 22 oz/in | 30 oz/in |
| Adhesion reduced slightly | | | | |
| 5 wt % TEA in water - 10 minute immersion | | | | |
| 22 oz/in | 14 oz/in | 16 oz/in | 16 oz/in | 20 oz/in |
| Adhesion reduced slightly | | | | |

Benzyl alcohol immersion performed the best in reducing and maintaining a reduced adhesion.

Example 3

AC-2K Maskant (ACP-3A Tan) panels that have been put through the chemical milling process were immersed in water baths to reduce adhesion. Two immersion baths were tested: (1) 5 wt % Benzyl Alcohol in water and (2) Bonderite C-IC Aldox V. Initial adhesion was measured for baseline before immersion into water baths. Subsequent adhesions were measured each day to record any 2K-maskant adhesion reduction. Adhesion measurements (oz/in) are set forth in Table 3.

TABLE 3

| AC-2K Maskant (ACP-3A Tan) | | | | | |
|---|---|---|---|---|---|
| Initial | Immediate | 1 Day | 2 Day | 3 Day | 4 Day |
| 5 wt % Benzyl Alcohol in water @110 F. - 15 minute immersion | | | | | |
| 20 | 10 | 10 | 16 | 16 | 16 |
| Adhesion reduced. | | | | | |
| Aldox V - 10 minute immersion | | | | | |
| 20 | 10 | 16 | 16 | 16 | 16 |
| Adhesion reduced slightly, but not significant enough | | | | | |

Benzyl alcohol immersion performed the better than Aldox V in reducing adhesion.

Example 4

Commercial benzyl alcohol paint strippers: Bonderite S-ST 1270-6 Aero Paint Stripper (40-50 wt % benzyl alcohol, 1-5 wt % alkylphenol ethoxylate emulsion) and Cee-Bee E-2787 (40-60 wt % benzyl alcohol emulsion) were applied over AC-2K Maskant (ACP-3A Tan) panels that have been put through the chemical milling process in an attempt to reduce adhesion. Initial adhesion was measured for baseline before immersion into water baths. Subsequent adhesions were measured each day to record any 2K-maskant adhesion reduction. Adhesion measurements (oz/in) are set forth in Table 4.

TABLE 4

| | | AC-2K Maskant (ACP-3A Tan) | | | | |
|---|---|---|---|---|---|---|
| Initial | 1 Hour | 1 Day | 2 Day | 3 Day | 4 Day | 7 Day |
| | | Bonderite S-ST-1270-6 Aero Paint Stripper | | | | |
| 20 | 8 | 4 | 2 | 8 | 14 | 20 |
| | | Cee-Bee E-2787 | | | | |
| 22 | 2 | 6 | 8 | 12 | 14 | 20 |

Maskant film physical properties (tensile/elongation) were not detrimentally affected. Both commercial products have excellent sag resistance. Bonderite S-ST-1270-6 Aero Paint Stripper and Cee-Bee E-2787 were effective at reducing adhesion for 4 days.

Example 5

Bonderite S-ST 1270-6 Aero Paint Stripper (40-50 wt % benzyl alcohol, 1-5 wt % alkylphenol ethoxylate emulsion) and Cee-Bee E-2787 (40-60 wt % benzyl alcohol emulsion) were separately applied with a roller over AC-2K Maskant (ACP-3A Tan) panels that had each been put through the chemical milling process in an attempt to reduce adhesion. Initial adhesion was measured for baseline before immersion into water baths. Subsequent adhesions were measured each day to record any 2K-maskant adhesion reduction. Adhesion measurements (oz/in) are set forth in Table 5.

TABLE 5

| | | AC-2K Maskant (ACP-3A Tan) | | | | |
|---|---|---|---|---|---|---|
| Initial | 1 Hour | 1 Day | 2 Day | 3 Day | 4 Day | 7 Day |
| | | Bonderite S-ST-1270-6 Aero Paint Stripper | | | | |
| 16 | 10 | 2 | 4 | 8 | 8 | 12 |
| | | Cee-Bee E-2787 | | | | |
| 16 | 4 | 2 | 2 | 4 | 6 | 10 |

Bonderite S-ST-1270-6 Aero Paint Stripper and Cee-Bee E-2787 were effective at reducing adhesion for 4 days. Maskant film properties (tensile/elongation) were not detrimentally affected. Both commercial products have excellent sag resistance.

Example 6

AC Products manufactured paint stripper formulations: GD8-69 (40 wt % Benzyl Alcohol in water) and GD8-72 (50 wt % Benzyl alcohol in water) were roller applied over AC-2K Maskant (ACP-3A Tan) panels that have been put through the chemical milling process in an attempt to reduce adhesion. Initial adhesion was measured for baseline before immersion into water baths. Subsequent adhesions were measured each day to record any 2K-maskant adhesion reduction. Adhesion measurements (oz/in) are set forth in Table 6.

TABLE 6

| | | AC-2K Maskant (ACP-3A Tan) | | | | |
|---|---|---|---|---|---|---|
| Initial | 1 Hour | 1 Day | 2 Day | 3 Day | 4 Day | 6 Day |
| | | GD8-69 | | | | |
| 14 | 6 | 4 | 4 | 6 | 8 | 16 |
| | | GD8-72 | | | | |
| 12 | 4 | 2 | 2 | 2 | 8 | 12 |

Maskant film physical properties (tensile/elongation) were not detrimentally affected. Both formulas have excellent sag resistance.

Example 7

AC Products manufactured paint stripper formulations: GD9-121 and GD9-122 were roller applied over AC-2K Maskant (ACP-3A Tan) panels that have been put through the chemical milling process in an attempt to reduce adhesion. GD9-121 and GD9-122 are lower VOC formulations using ester alcohol and benzyl alcohol.

TABLE 7

| GD9-121 and GD9-122 Formulations | |
|---|---|
| Benzyl Alcohol | 30-50% |
| Corrosion Inhibitor | 0-2% |
| Fragrance | 0-1% |
| Dye | 0-1% |
| Thickener | 0-5% |
| Emulsifier | 0-5% |
| Water | 30-50% |
| Wax | 0-5% |

Initial adhesion was measured as a benchmark before application of GD9-121 and GD9-122. All formulations were applied at 10 wet mils. Subsequent adhesions were measured each day to record any 2K-maskant adhesion reduction. Adhesion measurements (oz/in) are set forth in Table 8.

TABLE 8

| ACP-3A Maskant | | Adhesion (oz/in) Time after application | | | | | | | | |
|---|---|---|---|---|---|---|---|---|---|---|
| Formula | Thickness (mils) | Initial | 1 hour | 4 hours | 1 day | 2 days | 3 days | 4 days | 5 days | 6 days | 7 days |
| GD9-121 | 20 | 11 | 6 | 3 | 1 | <1 | 1 | 1 | 2 | 2 | 2 |
| GD9-122 | 20 | 11 | 6 | 1 | 1 | <1 | <1 | <1 | 1 | 1 | 1 |

Maskant film physical properties (tensile/elongation) were not detrimentally affected. All formulas have excellent sag resistance.

Conclusion: GD9-121 and GD9-122 were successful in reducing adhesion up to seven days; 82% and 91% adhesion reduction respectively.

Example 8

AC Products manufactured paint stripper formulations: GD9-132 and GD9-122 were roller applied over AC-2K Maskant (ACP-3A Tan) and AC-2K Maskant (ACP-5) panels that have been put through the chemical milling process in an attempt to reduce adhesion.

TABLE 9

| GD9-132 Formulation | |
|---|---|
| Benzyl Alcohol | 30-50% |
| Corrosion Inhibitor | 0-2% |
| Fragrance | 0-1% |
| Dye | 0-1% |
| Thickener | 0-5% |
| Emulsifier | 0-5% |
| Water | 30-50% |
| Wax | 0-5% |

Initial adhesion was measured as a benchmark before application of GD9-132 and GD9-122. All formulations were applied at 10 wet mils. Subsequent adhesions were measured each day to record any 2K-maskant adhesion reduction. Adhesion measurements (oz/in) are set forth in Table 10.

TABLE 10

| | Adhesion (oz/in) Time after application | | | | | | | | | |
|---|---|---|---|---|---|---|---|---|---|---|
| GD9-132 | Initial | 1 hour | 4 hours | 1 day | 2 days | 3 days | 4 days | 5 days | 6 days | 7 days |
| ACP-3A Tan | 22 | 14 | n/a | 2 | 2 | 2 | 2 | 2 | 2 | 4 |
| ACP-5 | 84 | 72 | n/a | 36 | 22 | 26 | 28 | 30 | 32 | 34 |

| | Adhesion (oz/in) Time after application | | | | | | | | | |
|---|---|---|---|---|---|---|---|---|---|---|
| GD9-122 | Initial | 1 hour | 4 hours | 1 day | 2 days | 3 days | 4 days | 5 days | 6 days | 7 days |
| ACP-3A Tan | 12 | 10 | 1 | <1 | <1 | 1 | 1 | 2 | 2 | 2 |
| ACP-5 | 76 | 54 | 48 | 48 | 34 | 36 | 36 | 40 | 34 | 28 |

Maskant film physical properties (tensile/elongation) were not detrimentally affected. All formulas have excellent sag resistance.

Conclusion: GD9-132 and GD9-122 were successful in reducing adhesion up to seven days; 60-82% and 64-84% adhesion reduction respectively.

Example 9

AC Products manufactured paint stripper formulations: GD9-132 (benzyl alcohol based), GD9-122 (ester alcohol, benzyl alcohol blend), and Methylene Chloride based formulation (Jasco) were applied over AC-2K Maskant (ACP-3A Tan) maskant film. Maskant films tested for tensile strength and elongation via ASTM D1708-13.

Initial tensile strength of AC-2K Maskant (ACP-3A Tan) was measured in oz/in$^2$ at before application of GD9-132, GD9-122, Jasco. Subsequent tensile strength measurements were made periodically to record 2K-maskant tensile strength reductions. Tensile strength measurements (oz/in$^2$) are set forth in Table 11.

TABLE 11

| | Maskant Thickness | Ultimate Tensile Strength (Oz/in$^2$) Time after application | | | |
|---|---|---|---|---|---|
| Formula | (mils) | Initial | 2 hours | 1 day | 4 days |
| GD9-132 | 15 | 21333 | 2400 | 2933 | 9600 |
| GD9-122 | 12 | 26667 | 4333 | 3667 | 13333 |
| Jasco | 12 | 26667 | 0 | 0 | 1333 |

GD9-132 (benzyl alcohol) and GD9-122 (ester alcohol/benzyl alcohol blend) were successful in maintaining non-detrimental elongation and tensile strength, 11-55% and 16-50% tensile strength respectively. Jasco (methylene chloride) was unsuccessful at providing an elongation and tensile strength suitable for 2K-Maskant removal, exhibiting irreparable 2K-maskant damage when undisturbed and 0-5% tensile strength.

Example 10

AC Products manufactured paint stripper formulations: GD9-132 (benzyl alcohol based), GD9-122 (ester alcohol, benzyl alcohol blend), and AC-2K NMP Stripper (1-Methyl-2-pyrrolidone) were applied over AC-2K Maskant (ACP-3A Tan) maskant film. Maskant films were tested for tensile strength and elongation via ASTM D1708-13.

Initial Tensile strength of AC-2K Maskant (ACP-3A Tan) was measured in oz/in$^2$ before application of: GD9-132, GD9-122, AC-2K NMP Stripper. Subsequent tensile strength measurements were made periodically to record 2K-maskant tensile strength reductions. Tensile strength measurements (oz/in$^2$) are set forth in Table 12.

TABLE 12

| Formula | Maskant Thickness (mils) | Ultimate Tensile Strength (Oz/in²) Time after application | | | |
|---|---|---|---|---|---|
| | | Initial | 2 hours | 1 day | 2 days |
| GD9-132 | 18 | 21333 | 5333 | 6222 | 4444 |
| GD9-122 | 18 | 21333 | 6889 | 6667 | 6222 |
| AC-2K NMP Stripper | 18 | 21333 | 3778 | 3556 | 7111 |

GD9-132 (benzyl alcohol), GD9-122 (ester alcohol/benzyl alcohol blend), and AC-2K NMP Stripper (1-Methyl-2-pyrrolidone) were successful in maintaining non-detrimental elongation and tensile strength, 20-29%, 29-32%, and 17-33% tensile strength respectively.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A method of reducing adhesion between a maskant and a substrate from an initial adhesion to render the maskant removable by mechanically applied force, wherein the maskant comprises a plural component reactive coating and is adhered to a surface of the substrate, the method comprising:
applying a composition to the maskant to achieve a subsequent adhesion that is less than the initial adhesion, wherein the composition comprises a solvent including one or more of benzyl alcohol, triethanolamine, water, and ester alcohol, and wherein the composition excludes toluene, xylene, methylethyl ketone, acetone, and methylene chloride;
wherein the plural component reactive coating has a thickness on the substrate of between about 0.008 inches to about 0.025 inches; and
wherein the subsequent adhesion is between 60% and 0.1% of the initial adhesion such that the plural component reactive coating retains an adhesion force sufficient to remain adhered to the substrate until the plural component reactive coating is removed by the mechanically applied force.

2. The method of claim 1, wherein the composition comprises an aqueous mixture of one or more of benzyl alcohol, triethanolamine, and ester alcohol.

3. The method of claim 1, wherein the composition consists essentially of an aqueous solution of one or more of benzyl alcohol, triethanolamine, and ester alcohol.

4. The method of claim 1, wherein the composition further comprises one or more of a flame retardant, an amine, a plasticizer, and a surfactant.

5. The method of claim 1, wherein the maskant comprises a polyurea.

6. The method of claim 1, wherein the maskant comprises a polyurethane.

7. The method of claim 1, wherein the substrate comprises a metal.

8. The method of claim 1, wherein applying is by painting, immersing, flow coating, or spraying.

9. The method of claim 1, wherein the subsequent adhesion is between 4 oz/in and 0.1 oz/in.

10. The method of claim 1, wherein the subsequent adhesion is reduced to between 60% and 0.1% of the initial adhesion within one hour of application.

11. The method of claim 1, wherein the subsequent adhesion remains reduced to between 60% and 0.1% of the initial adhesion for at least 1 day, preferably for at least 4 days, more preferably for at least 1 week.

12. The method of claim 1, wherein the subsequent adhesion is less than the initial adhesion for a period of time, the method further comprising applying the composition to the maskant one or more additional times to prolong the period of time during which the subsequent adhesion is less than the initial adhesion.

13. The method of claim 1, wherein the maskant and substrate have undergone chemical milling prior to the step of applying the composition to the maskant.

14. The method of claim 1, wherein the plural component reactive coating is a two component reaction system.

15. The method of claim 1, wherein the plural component reactive coating comprises one or more of a polyurethane, a polyurea, a polyisocyanate, a polyamide, a polyol, a polybasic acid an acid chloride, or an acid anhydride.

16. The method of claim 15, wherein the plural component reactive coating comprises a polyurethane and a polyurea.

17. The method of claim 1, wherein the maskant is removable by hand.

* * * * *